United States Patent
Seaman et al.

[11] Patent Number: 6,129,622
[45] Date of Patent: Oct. 10, 2000

[54] PAIR OF SCISSORS FOR CUTTING SHELLFISH

[76] Inventors: Allen Seaman; Janice Seaman, both of 51 Harvard Ave., Wyckoff, N.J. 07481

[21] Appl. No.: 09/140,597

[22] Filed: Aug. 26, 1998

[51] Int. Cl.[7] ............................ A22C 29/02; A22C 29/04; B26B 13/00
[52] U.S. Cl. ............................ 452/6; 452/1; 452/17; 30/233; 30/230; 30/232
[58] Field of Search ..................... 452/1, 4, 6, 12, 452/17; 30/254, 230, 232, 233, 355

[56] References Cited

U.S. PATENT DOCUMENTS

| | | | |
|---|---|---|---|
| 249,818 | 11/1881 | Bailey | 30/131 |
| 280,510 | 7/1883 | Phipps | 30/135 |
| 413,652 | 10/1889 | Dunham | 30/233 |
| 731,687 | 6/1903 | Kanter | 30/233 |
| 973,296 | 10/1910 | Peddle | 30/233 |
| 1,272,123 | 7/1918 | Schell | 30/233 |
| 1,279,389 | 9/1918 | Malsin | 30/233 |
| 1,330,515 | 2/1920 | Bryant | 30/233 |
| 1,600,225 | 9/1926 | Helpern | 606/174 |
| 2,603,864 | 7/1952 | Neola | 30/229 |
| 3,078,503 | 2/1963 | Webb | 452/117 |
| 3,877,145 | 4/1975 | Andrews | 30/231 |
| 4,103,395 | 8/1978 | Latorella | 452/6 |
| 4,209,901 | 7/1980 | Hemingway | 30/233 |
| 4,519,136 | 5/1985 | Walker | 30/142 |
| 5,108,343 | 4/1992 | Gilliam | 452/6 |
| 5,297,342 | 3/1994 | Malone | 30/233 |
| 5,379,521 | 1/1995 | Lynders | 30/233 |
| 5,403,230 | 4/1995 | Capriglione, Sr. | 452/6 |
| 5,501,016 | 3/1996 | Kuribayashi | 30/260 |
| 5,517,762 | 5/1996 | Kuribayshi | 30/260 |
| 5,613,904 | 3/1997 | LaSalle et al. | 452/6 |
| 5,832,612 | 11/1998 | Cornell et al. | 30/233 |

FOREIGN PATENT DOCUMENTS

| | | | |
|---|---|---|---|
| 783846 | 7/1935 | France | 452/17 |
| 2475359 | 8/1981 | France | 452/17 |
| 25386 | 12/1883 | Germany | 452/1 |
| 3328 | of 1886 | United Kingdom | 452/17 |
| 17066 | of 1891 | United Kingdom | 452/17 |
| 3358 | of 1894 | United Kingdom | 452/17 |

*Primary Examiner*—Michael J. Carone
*Assistant Examiner*—Frederick T. French, III

[57] ABSTRACT

A pair of scissors for cutting shellfish cleanly and shielding airborne matter created thereby from contacting a user. The pair of scissors include a stationary blade body, a moving blade body, and a shield. The moving blade body is pivotally attached to the stationary blade body and forms therewith a scissor-like device for cutting the shellfish. The shield shields the airborne matter created by cutting the shellfish from contacting the user, and is replaceably disposed on the moving blade body which allows the shield to be removed and washed. The shield includes an attaching portion that is generally channel-shaped and replaceably receives the moving blade body, and a shield portion that includes a distal tip part that is generally pointed for facilitating penetration into the shellfish and a proximal part that is slightly convexo-concave-shaped for shielding the airborne matter created by cutting the shellfish from contacting the user and has a concave surface that is substantially hyperbolic in lateral profile for facilitating rebounding of the airborne matter. The proximal part extends laterally divergingly for a slight distance from the distal tip part, then substantially uniformly, and then laterally convergingly for a slight distance to the attaching portion which prevents interference with the stationary blade body during cutting.

8 Claims, 3 Drawing Sheets

PAIR OF SCISSORS FOR CUTTING SHELLFISH

BACKGROUND OF THE INVENTION

1. Field of the Invention

The present invention relates to a pair of scissors. More particularly, the present invention relates to a pair of scissors for cutting shellfish cleanly and shielding airborne matter created thereby from contacting a user.

2. Description of the Prior Art

After a stormy period in the late 1980's and early 1990's, the seafood market is back on track. Greater supplies of seafood, lower prices, and a strong economy have spurred sales. According to FIND/SVP, a New York City market research firm, the seafood market reached $8.8 billion in sales in 1996. This is a significant increase over prior years where business was flat or even declined. The recent transition from the traditional fine dining approach makes the dining experience more fun. FINL)/SVP predicts that seafood consumption will continue to grow as a result of the rise in personal income, health concerns of an aging population, and an increased immigration population made up of people accustomed to seafood diets.

Ever since people have been eating seafood, they have been searching for ways to cut shells and claws cleanly and efficiently while protecting themselves for the airborne matter created thereby. Currently, most people use knives and nutcrackers to perform this task. Although these tools will accomplish the job, they are not designed for this type of cutting and often require considerable effort while affording no protection to the user from airborne matter created from the cutting and cracking operations.

One of the biggest problems that seafood lovers face when eating lobsters and crabs is cutting the shells without making a huge mess. Pieces of shell often end up airborne at the dinner table. To see evidence of this fact, one merely needs to witness the expression on the face of someone cutting a lobster tail. They squint in anticipation of a piece of flying shell as if they are guessing which wire to cut to diffuse a bomb.

Numerous innovations for pairs of scissors have been provided in the prior art that will be described. Even though these innovations may be suitable for the specific individual purposes to which they address, however, they differ from the present invention in that they do not teach a pair of scissors for cutting shellfish cleanly and shielding airborne matter created thereby from contacting the user.

FOR EXAMPLE, U.S. Pat. No. 5,108,343 to Gilliam teaches a seafood dressing tool that includes a pair of pivotally interconnected lever members. The lever members form a pair of grips or handles on one of their ends and a pair of curved, slender blades on their other ends. One lever member forms the lower grip or handle and the upper blade, and the other or second lever member forms the upper grip or handle and the lower blade. The blades curve downwardly with respect to the longitudinal centerline of the tool when oriented for normal use. The lower blade has a relatively sharp upper knife edge, and the upper blade has a lower edge cooperable with the upper knife edge of the lower blade for effecting scissors-like cutting action when the handles or grips are squeezed closed toward one another. The lower blade is adapted for insertion longitudinally into the body of a headless shrimp at its proximal end when the blades are in an open position, with the upper blade then being superposed along the shrimp's back. The lower blade is inserted into the shrimp until it nearly reaches, but stops short of, the shrimp's tail. When the blades are closed, the blade action is adapted for snipping the body and shell of the shrimp transversely from the shrimp's back to its midportion along its length, again stopping short of the tail.

ANOTHER EXAMPLE, U.S. Pat. No. 5,501,016 to Kuribayashi teaches a pair of blade replacement type scissors in which a shaft portion of a blade portion is engaged with a groove formed in a shaft portion of a grip so that the respective shaft portions can be bolted together and in which the grip can be separated to two parts or coupled by inserting one part into the other part and fixed with a stopper screw so that the blade portion can be replaced and the length of the grip can be adjusted, and a pair of scissors in which the blade lines of the moving blade and the stationary blade are warped in the shape of an arc in the same direction in order to facilitate the cutting of hair.

FINALLY, STILL ANOTHER EXAMPLE, U.S. Pat. No. 5,517,762 to Kuribayashi teaches a pair of blade replacement type scissors in which a shaft portion of a blade portion is engaged with a groove formed in a shaft portion of a grip so that the respective shaft portions can be bolted together and in which the grip can be separated to two parts or coupled by inserting one part into the other part and fixed with a stopper screw so that the blade portion can be replaced and the length of the grip can be adjusted, and a pair of scissors in which the blade lines of the moving blade and the stationary blade are warped in the shape of an arc in the same direction in order to facilitate the cutting of hair.

It is apparent that numerous innovations for pairs of scissors have been provided in the prior art that are adapted to be used. There exists, however, a need for a pair of scissor that not only cuts shellfish cleanly, but also shields the airborne matter created thereby from contacting the user.

Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a pair of scissors for cutting shellfish cleanly and shielding airborne matter created thereby from contacting a user that avoids the disadvantages of the prior art.

ANOTHER OBJECT of the present invention is to provide a pair of scissors for cutting shellfish cleanly and shielding airborne matter created thereby from contacting a user that is simple and inexpensive to manufacture.

STILL ANOTHER OBJECT of the present invention is to provide a pair of scissors for cutting shellfish cleanly and shielding airborne matter created thereby from contacting a user that is simple to use.

BRIEFLY STATED, YET ANOTHER OBJECT of the present invention is to provide a pair of scissors for cutting shellfish cleanly and shielding airborne matter created thereby from contacting a user. The pair of scissors include a stationary blade body, a moving blade body, and a shield. The moving blade body is pivotally attached to the stationary blade body and forms therewith a scissor-like device for cutting the shellfish. The shield shields the airborne matter created by cutting the shellfish from contacting the user and is replaceably disposed on the moving blade body which allows the shield to be removed and washed. The shield includes an attaching portion that is generally channel-shaped and replaceably receives the moving blade body and a shield portion that includes a distal tip part that is generally pointed for facilitating penetration into the shellfish and a proximal part that is slightly convexo-concave-shaped for shielding the airborne matter created by cutting the shellfish from contacting the user and has a concave surface that is substantially hyperbolic in lateral profile for facilitating rebounding of the airborne matter. The proximal part extends laterally divergingly for a slight distance from the distal tip part, then substantially uniformly, and then laterally convergingly for a slight distance to the attaching portion which prevents interference with the stationary blade body during cutting.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1:
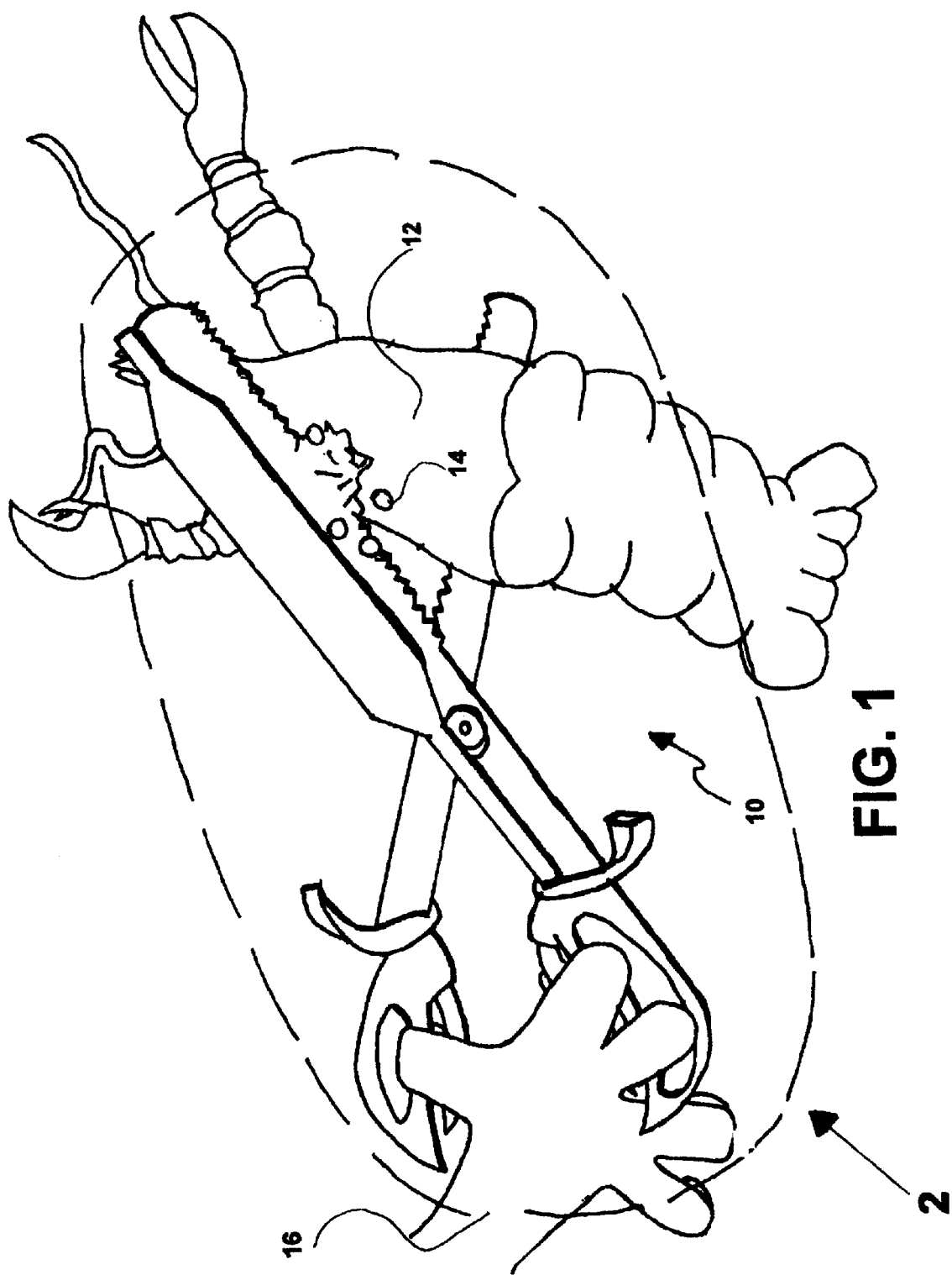
FIG. 1 is a diagrammatic perspective view of the present invention being utilized to cut a shellfish cleanly.

LIST OF REFERENCE NUMERALS UTILIZED IN THE DRAWING 10 pair of scissors for cutting shellfish cleanly and shielding airborne matter created thereby from contacting a user of the present invention
12 shellfish
14 airborne matter
16 user
18 stationary blade body
20 moving blade body
22 scissor-like device for cutting shellfish 12
24 shield for shielding airborne matter 14 created by cutting shellfish 12 from contacting user 16
26 grip portion of stationary blade body 18
28 blade portion of stationary blade body 18
30 pivot throughbore
32 imaginary junction of grip portion 26 of stationary blade body 18 and blade portion 28 of stationary blade body 18
34 grip portion of moving blade body 20
36 blade portion of moving blade body 20
38 pivot throughbore
40 imaginary junction of grip portion 34 of moving blade body 20 and blade portion of moving blade body 20
42 pivot-type pin
44 serrations along opposing edges 46 of blade portion 28 of stationary blade body 18 and blade portion 36 of moving blade body 20 for cutting shellfish 12 cleanly
46 opposing edges of blade portion 28 of stationary blade body 18 and blade portion 36 of moving blade body 20
48 stationary blade body handle disposed around grip portion 26 of stationary blade body 18
50 throughbore in stationary blade body handle 48 for receiving thumb of user 16
51 forward edge of stationary blade body handle 48
52 moving blade body handle disposed around grip portion 34 of moving blade body 20
54 two finger throughbore in moving blade body handle 52 for receiving first two fingers of user 16
55 forward edge of moving blade body handle 52
56 free end of moving blade body 20
58 another edge of moving blade body 20
60 attaching portion of shield 24
62 free end tip of attaching portion 60 of shield 24
64 uppermost edge of attaching portion 60 of shield 24
66 shield portion of shield 24
68 distal tip part of shield portion 66 of shield 24 for facilitating penetration into shellfish 12
70 proximal part of shield portion 66 of shield 24 for shielding airborne matter 14 created by cutting shellfish 12 from contacting user 16
72 concave surface of proximal part 70 of shield portion 66 of shield 24
74 axial centerline of concave surface 72 of proximal part 70 of shield portion 66 of shield 24

DETAILED DESCRIPTION OF THE PREFERRED EMBODIMENT

The present invention is used to cut shellfish, such as crabs, lobster tails and claws, and the like. It potentially replaces knives and nutcrackers as the preferred tool for eating seafood. Many seafood lovers will appreciate the present invention as an efficient and easy-to-use utensil to help crack shells.

The present invention is a pair of scissors that not only cuts shellfish cleanly, but also shields the airborne matter created thereby from contacting the user. The present invention is used like an ordinary pair of scissors and is easily operated to perform the task of cutting seafood. The handle of the pair of scissors of the present invention is shaped like a lobster claw and the blades are serrated.

The present invention is made to specifically handle the chore of cutting seafood with much less effort than using knives and nutcrackers while shielding the user from the airborne matter created from the cutting and cracking operations.

The main advantage that the present invention has over a pair knives and nutcrackers is its ability to cut the shellfish cleanly and shield the user from airborne matter created by the cutting and cracking operations. The present invention is user-friendly and safe, and makes a clean cut every time with no mess, no struggle, and no problem.

Referring now to the figures, in which like numerals indicate like parts, and particularly to FIG. 1, which is a diagrammatic perspective view of the present invention being utilized to cut a shellfish cleanly, the pair of scissors for cutting shellfish cleanly and shielding airborne matter created thereby from contacting a user of the present invention is shown generally at 10 for cutting shellfish 12 cleanly and shielding airborne matter 14 created thereby from contacting a user 16.

Figure 2:
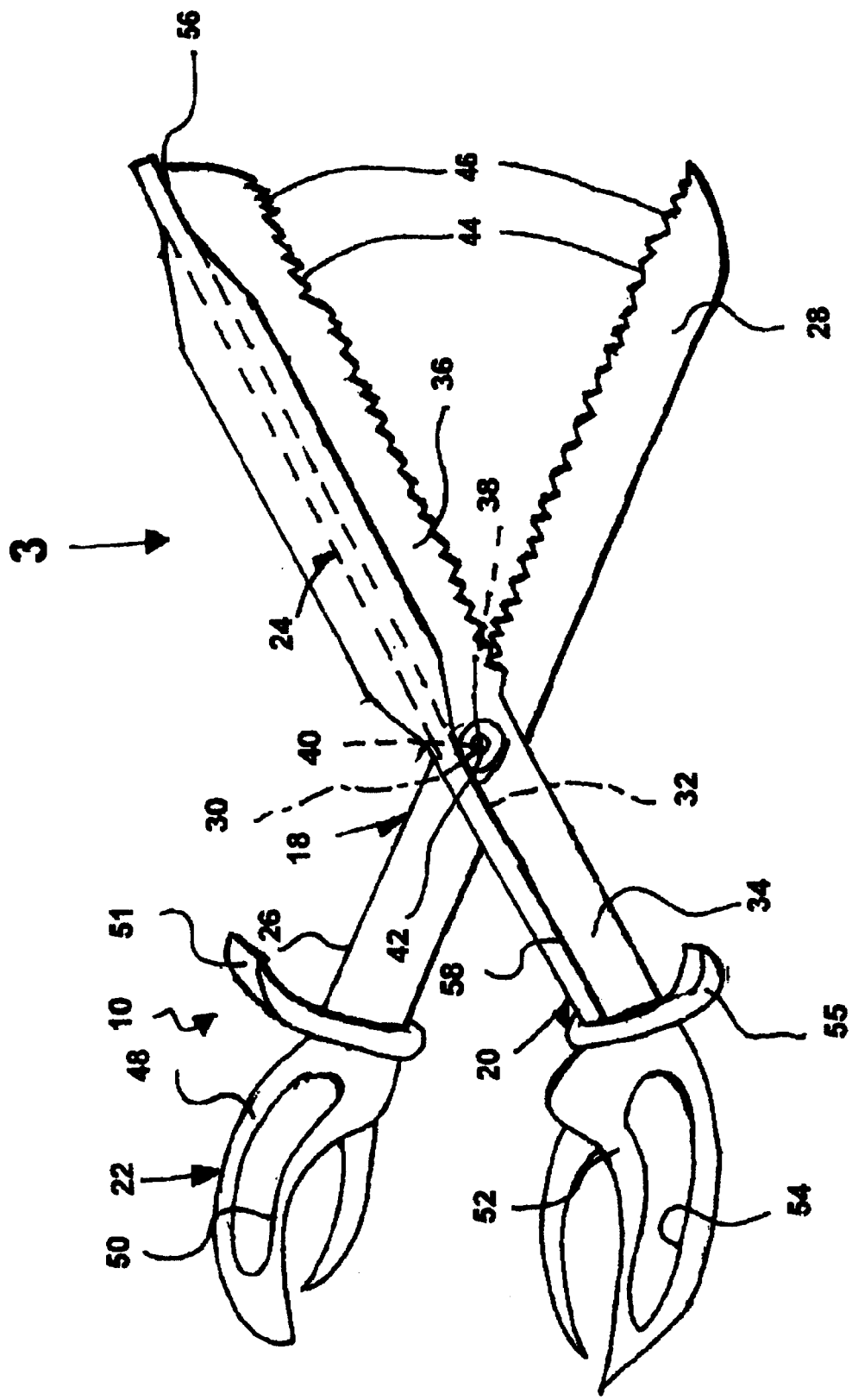
FIG. 2 is a diagrammatic perspective view of the area generally enclosed by the dotted ellipse identified by ARROW 2 in FIG. 1 of the present invention.

The general configuration of the pair of scissors for cutting shellfish cleanly and shielding airborne matter created thereby from contacting a user 10 can best be seen in FIG. 2, which is a diagrammatic perspective view of the area generally enclosed by the dotted ellipse identified by ARROW 2 in FIG. 1 of the present invention, and as such will be discussed with reference thereby.

The pair of scissors for cutting shellfish cleanly and shielding airborne matter created thereby from contacting a user 10 comprises a stationary blade body 18 and a moving blade body 20 pivotally attached to the stationary blade body 18 and forming therewith a scissor-like device 22 for cutting the shellfish 12.

The stationary blade body 18 and the moving blade body 20 are both made from stainless steel.

The pair of scissors for cutting shellfish cleanly and shielding airborne matter created thereby from contacting a user 10 further comprises a shield 24 for shielding the airborne matter 14 created by cutting the shellfish 12 from contacting the user 16, and is disposed along the moving blade body 20.

The stationary blade body 18 has a grip portion 26, a blade portion 28 that extends from the grip portion 26 of the stationary blade body 18, and a pivot throughbore 30, at their imaginary junction 32.

The moving blade body 20 has a grip portion 34, a blade portion 36 that extends from the grip portion 34 of the moving blade body 20, and a pivot throughbore 38, at their imaginary junction 40.

The moving blade body 20 is pivotally attached to the stationary blade body 18 by a pivot-type pin 42 that enters the pivot throughbore 30 in the stationary blade body 18 and the pivot throughbore 38 in the moving blade body 20.

The blade portion 28 of the stationary blade body 18 and the blade portion 36 of the moving blade body 20 has serrations 44 along opposing edges 46 thereof for cutting the shellfish 12 cleanly.

The grip portion 26 of the stationary blade body 18 has disposed therearound a stationary blade body handle 48, which is shaped like the upper portion of a claw of the shellfish 12, and which has a thumb throughbore 50 for receiving the thumb of the user 16.

The stationary blade body handle 48 has a forward edge 51 which faces the blade portion 28 of the stationary blade body 18, and flares outwardly from the grip portion 26 of the stationary blade body 18 to provide a barrier for preventing liquids flowing down the stationary blade body 18 from contacting the hand of the user 16.

The stationary blade body handle 48 is replaceably affixed around the grip portion 26 of the stationary blade body 18 which allows the stationary blade body handle 48 to be removed and washed, and is made from neoprene which allows the stationary blade body handle 48 to be sturdy and dish washer safe.

The grip portion 34 of the moving blade body 20 has disposed therearound a moving blade body handle 52, which is shaped like the lower portion of the claw of the shellfish 12, and which has a two finger throughbore 54 for receiving the first two fingers of the user 16, and together with the stationary blade body handle 48 replicates the claw of the shellfish 12.

The moving blade body handle 52 has a forward edge 55 which faces the blade portion 36 of the moving blade body 20, and flares outwardly from the grip portion 34 of the moving blade body 20 to provide a barrier for preventing liquids flowing down the moving blade body 20 from contacting the hand of the user 16.

The moving blade body handle 52 is replaceably affixed around the grip portion 34 of the moving blade body 20 which allows the moving blade body handle 52 to be removed and washed, and is made from neoprene which allows the moving blade body handle 52 to be sturdy and dish washer safe.

The moving blade body 20 has a free end 56, and another edge 58 that opposes a respective opposing edge of the opposing edges 46 of the blade portion 28 of the stationary blade body 18 and the blade portion 36 of the moving blade body 20, and extends from the free end 56 of the moving blade body 20 to the moving blade body handle 52, with the shield 24 being disposed therealong.

Figure 3:
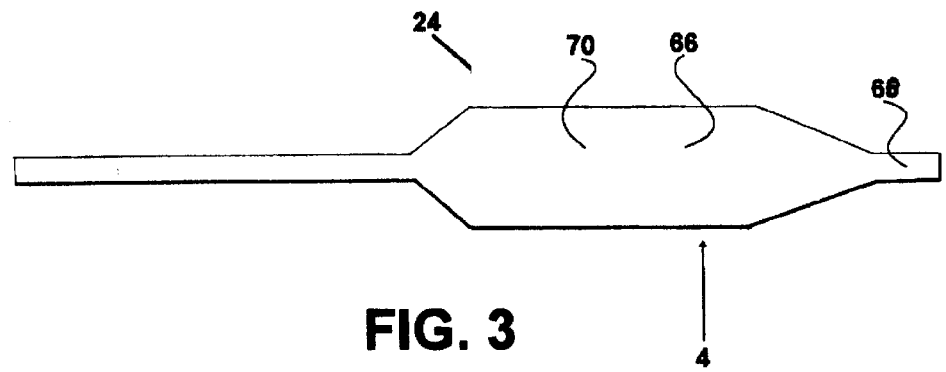
FIG. 3 is an enlarged diagrammatic top plan view taken generally in the direction of ARROW 3 in FIG. 2 of the shield of the present invention.
Figure 4:
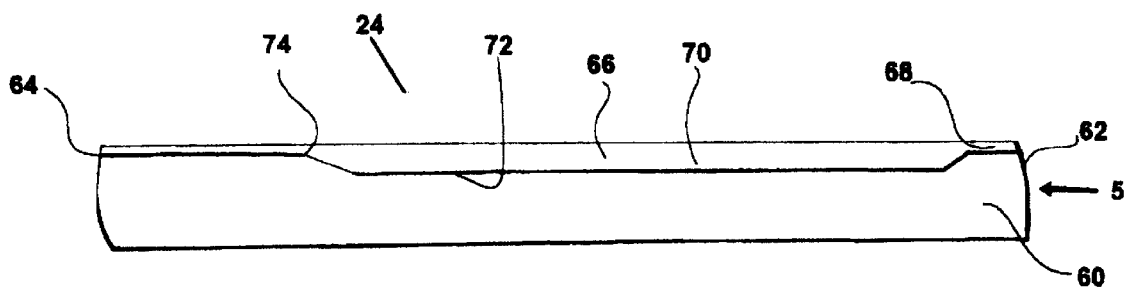
FIG. 4 is a diagrammatic side elevational view taken generally in the direction of ARROW 4 in FIG. 3.
Figure 5:
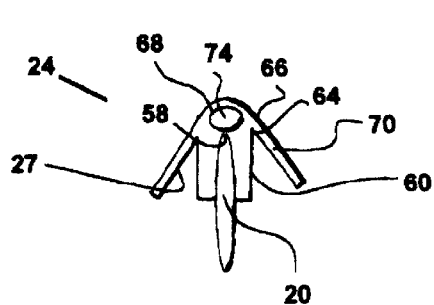
FIG. 5 is a diagrammatic end elevational view taken generally in the direction of ARROW 5 in FIG. 4.
Figure 6:
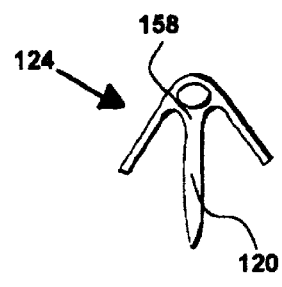
FIG. 6 is a splatter guard to protect the user of the scissor from flying objects.

The specific configuration of the shield 24 can best be seen in FIGS. 3–5, which are, respectively, an enlarged diagrammatic top plan view taken generally in the direction of ARROW 3 in FIG. 2 of the shield of the present invention, a diagrammatic side elevational view taken generally in the direction of ARROW 4 in FIG. 3, and a diagrammatic end elevational view taken generally in the direction of ARROW 5 in FIG. 4, and as such will be discussed with reference thereto.

The shield 24 is replaceably disposed on the another edge 58 of the moving blade body 20, which allows the shield 24 to he removed and washed, and is made from neoprene which allows the shield 24 to be sturdy and dish washer safe.

The shield 24 comprises an attaching portion 60 that is slender, elongated, and generally channel-shaped, and replaceably receives the another edge 58 of the moving blade body 20, and extends, at its free end tip 62, from the free end 56 of the moving blade body 20 to the forward edge 55 of the moving blade body handle 52, with the attaching portion 60 of the shield 24 having an uppermost edge 64.

The shield 24 further comprises a shield portion 66 that extends integrally along the uppermost edge 64 of the attaching portion 60 of the shield 24.

The shield portion 66 of the shield 24 comprises a distal tip part 68 that is slender, elongated and generally pointed for facilitating penetration into the shellfish 12, and extends a short distance from the free end tip 62 of the attaching portion 60 of the shield 24 towards the moving blade body handle 52.

The shield portion 66 of the shield 24 further comprises a proximal part 70 that is elongated, wide, and slightly convexo-concave-shaped for shielding the airborne matter 14 created by cutting the shellfish 12 from contacting the user 16, and has a concave surface 72 that is substantially hyperbolic in lateral profile for facilitating rebounding of the airborne matter 14, with the concave surface 72 of the proximal part 70 of the shield portion 66 of the shield 24 having an axial centerline 74.

The proximal part 70 of the shield portion 66 of the shield 24 extends laterally divergingly for a slight distance from the distal tip part 68 of the shield portion 66 of the shield 24, then substantially uniformly, and then laterally convergingly for a slight distance to the attaching portion 60 of the shield 24, at substantially the imaginary junction 40 of the grip portion 34 of the moving blade body 20 and the blade portion 36 of the moving blade body 20, which prevents interference with the stationary blade body 18 during cutting, with the axial centerline 74 of the concave surface 72 of the proximal part 70 of the shield portion 66 of the shield 24 extending integrally along the uppermost edge 64 of the attaching portion 60 of the shield 24, and with the proximal part 70 of the shield portion 66 of the shield 24 being substantially perpendicular to, and forming a substantially T-shaped lateral profile with, the attaching portion 60 of the shield 24.

It will be understood that each of the elements described above, or two or more together, may also find a useful application in other types of constructions differing from the types described above.

While the invention has been illustrated and described as embodied in a pair of scissors for cutting shellfish cleanly and shielding airborne matter created thereby from contacting a user, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A pair of scissors for cutting shellfish cleanly and shielding airborne matter created thereby from contacting a user, said pair of scissors comprising:

a) a stationary blade body; said stationary blade body having a grip portion, a blade portion extending from said grip portion of said stationary blade body, and a pivot throughbore disposed at an imaginary junction being where said blade portion of said stationary blade meets said grip portion of said stationary blade; said grip portion of said stationary blade body having disposed therearound a stationary blade body handle with a thumb throughbore for receiving the thumb of the user;

b) a moving blade body pivotally attached to said stationary blade body and forming therewith a scissor-like device for cutting the shellfish; said moving blade body having a grip portion, a blade portion extending from said grip portion of said moving blade body, and a pivot throughbore disposed at an imaginary junction being where said blade portion of said moving blade body meets said grip portion of said moving blade body; said blade portion of said stationary blade body and said blade portion of said moving blade body having serrations along opposing edges thereof for cutting the shellfish cleanly; said grip portion of said moving blade body having disposed therearound a moving blade body handle with a two finger throughbore for receiving the first two fingers of the user; said moving blade body handle having a forward edge facing said blade portion of said moving blade body, and extending outwardly and forwardly from said grip portion of said moving blade body, in a wide substantially L-shaped configuration, with a portion thereof extending in a direction away from said grip portion of said stationary blade body, and with a remaining portion thereof extending substantially parallel to said grip portion of said moving blade body, so as to provide a conduit for directing liquids flowing down said moving blade body away from the hand of the user; and c) a shield for shielding the airborne matter created by cutting the shellfish from contacting the user, and being disposed along said moving blade body; said moving blade body having an end, and another edge opposing a respective opposing edge of said opposing edges of said blade portion of said stationary blade body and said blade portion of said moving blade body, and extending from said end of said moving blade body to said moving blade body handle, with said shield being disposed therealong; said shield comprising an attaching portion being slender, elongated, and generally channel-shaped, and replaceably receiving said another edge of said moving blade body, and extending, at its end tip, from said end of said moving blade body to said forward edge of said moving blade body handle, with said attaching portion of said shield having an uppermost edge; said shield further comprising a shield portion extending integrally along said uppermost edge of said attaching portion of said shield; said shield portion of said shield comprising a distal tip part being slender, elongated and generally pointed for facilitating penetration into the shellfish, and extending a short distance from said end tip of said attaching portion of said shield towards said moving blade body handle; said shield portion of said shield further comprising a proximal part being elongated, wide, and slightly convexo-concave-shaped for shielding the airborne matter created by cutting the shellfish from contacting the user, and having a concave surface being substantially hyperbolic in lateral profile for facilitating rebounding of the airborne matter, with said concave surface of said proximal part of said shield portion of said shield having an axial centerline.

2. The pair of scissors as defined in claim 1, wherein said stationary blade body and said moving blade body are both made from stainless steel.

3. The pair of scissors as defined in claim 1, wherein said moving blade body is pivotally attached to said stationary blade body by a pivot-type pin that enters said pivot throughbore in said stationary blade body and said pivot throughbore in said moving blade body.

4. The pair of scissors as defined in claim 1, wherein said stationary blade body handle has a forward edge which faces said blade portion of said stationary blade body, and flares outwardly from said grip portion of said stationary blade body to provide a barrier for preventing liquids flowing down said stationary blade body from contacting the hand of the user.

5. The pair of scissors as defined in claim 1, wherein said stationary blade body handle is replaceably affixed around said grip portion of said stationary blade body which allows said stationary blade body handle to be removed and washed, and is made from neoprene which allows said stationary blade body handle to be sturdy and dish washer safe.

6. The pair of scissors as defined in claim 1, wherein said moving blade body handle is replaceably affixed around said grip portion of said moving blade body, which allows said moving blade body handle to be removed and washed, and is made from neoprene which allows said moving blade body handle to be sturdy and dish washer safe.

7. The pair of scissors as defined in claim 1, wherein said shield is replaceably disposed on said another edge of said moving blade body, which allows said shield to be removed and washed, and is made from neoprene which allows said shield to be sturdy and dish washer safe.

8. The pair of scissors as defined in claim 1, wherein said proximal part of said shield portion of said shield extends laterally divergingly for a slight distance from said distal tip part of said shield portion of said shield, then substantially uniformly, and then laterally convergingly for a slight distance to said attaching portion of said shield, at substantially said imaginary junction of said grip portion of said moving blade body and said blade portion of said moving blade body, which prevents interference with said stationary blade body during cutting, with said axial centerline of said concave surface of said proximal part of said shield portion of said shield extending integrally along said uppermost edge of said attaching portion of said shield, and with said proximal part of said shield portion of said shield being substantially perpendicular to, and forming a substantially T-shaped lateral profile with, said attaching portion of said shield.

* * * * *